(12) United States Patent
Vandorpe et al.

(10) Patent No.: US 7,396,132 B2
(45) Date of Patent: Jul. 8, 2008

(54) PRISM ASSEMBLY FOR USE IN OPTICAL DEVICES AND PROJECTOR COMPRISING SUCH A PRISM ASSEMBLY

(75) Inventors: Krist Vandorpe, Beveren-Leie (BE); Nico Coulier, Zulte (BE); Peter Gerets, Roeselare (BE); Stefan Lesschaeve, Oudenaarde (BE)

(73) Assignee: Barco, Naamloze Vennootschap, Kortrijk (BE)

( * ) Notice: Subject to any disclaimer, the term of this patent is extended or adjusted under 35 U.S.C. 154(b) by 331 days.

(21) Appl. No.: 11/210,749

(22) Filed: Aug. 25, 2005

(65) Prior Publication Data

US 2006/0044521 A1 Mar. 2, 2006

Related U.S. Application Data

(60) Provisional application No. 60/606,125, filed on Sep. 1, 2004.

(51) Int. Cl.
*G03B 21/00* (2006.01)
*G02F 1/00* (2006.01)
*G02F 1/1335* (2006.01)

(52) U.S. Cl. ............... 353/33; 353/81; 348/771; 349/57; 359/831

(58) Field of Classification Search ............ 353/33, 353/81, 84, 94, 119; 348/771; 359/831, 359/833, 834, 836; 349/57, 62
See application file for complete search history.

(56) References Cited

U.S. PATENT DOCUMENTS

| | | | | |
|---|---|---|---|---|
| 6,157,420 | A | 12/2000 | Nakanishi et al. | 349/9 |
| 6,249,387 | B1* | 6/2001 | Poradish et al. | 359/634 |
| 6,250,763 | B1 | 6/2001 | Fielding et al. | 353/31 |
| 6,561,652 | B1 | 5/2003 | Kwok et al. | 353/31 |
| 6,644,813 | B1 | 11/2003 | Bowron | 353/31 |
| 7,031,062 | B2* | 4/2006 | Kao | 359/618 |
| 2002/0141070 | A1* | 10/2002 | Sawai | 359/634 |
| 2003/0048423 | A1 | 3/2003 | Aastuen et al. | 353/31 |
| 2003/0147158 | A1* | 8/2003 | Penn | 359/833 |
| 2006/0044654 | A1* | 3/2006 | Vandorpe et al. | 359/834 |

* cited by examiner

*Primary Examiner*—Andrew T Sever
(74) *Attorney, Agent, or Firm*—Bacon & Thomas, PLLC

(57) ABSTRACT

A prism assembly for use in optical devices, which includes a total internal reflection (TIR) assembly for redirecting an incoming lightbeam, a color prism assembly for splitting the incoming lightbeam into spectral bands, and at least one reflection light valve for redirecting and recombining the spectral bands to form an outgoing lightbeam, wherein the total internal reflection assembly has a back surface and said color prism assembly has a frontal surface facing said back surface and being parallel therewith, and wherein said back surface forms an angle with a general plane defined by the incoming and the outgoing lightbeams, which is different from 90°.

19 Claims, 6 Drawing Sheets

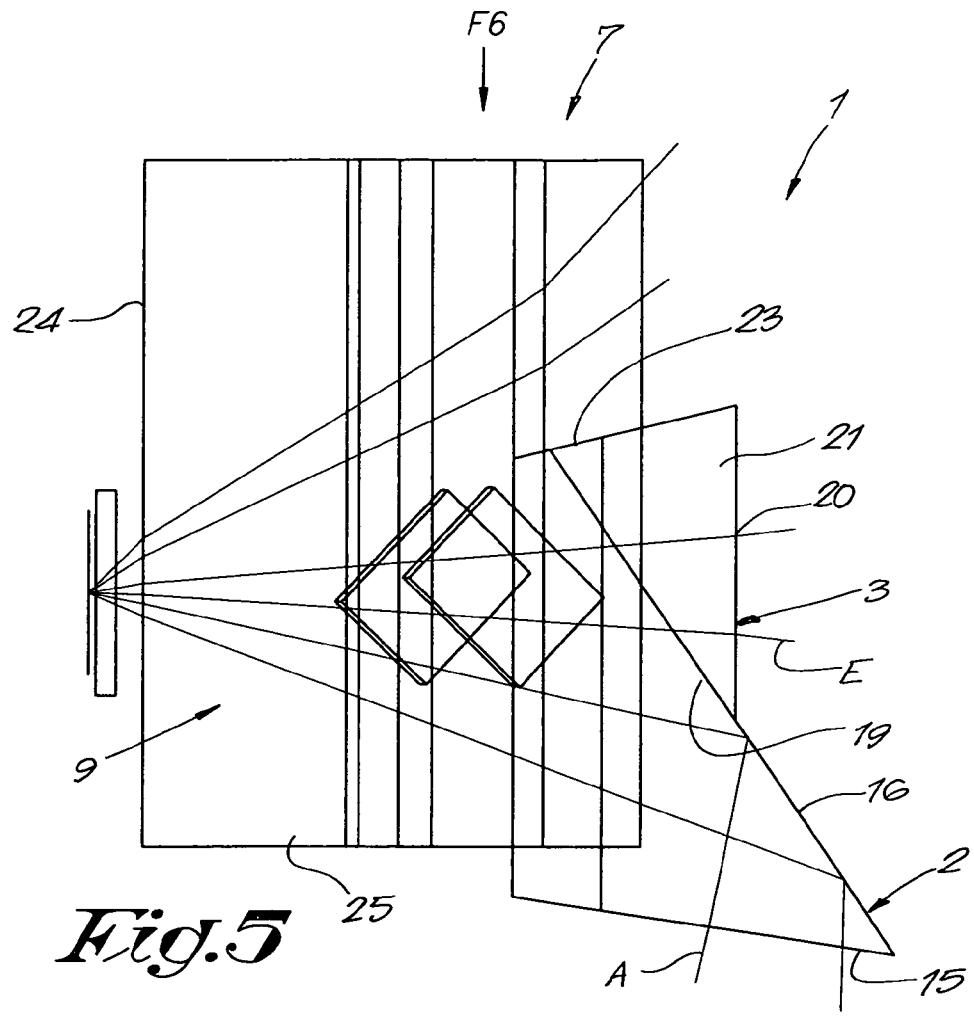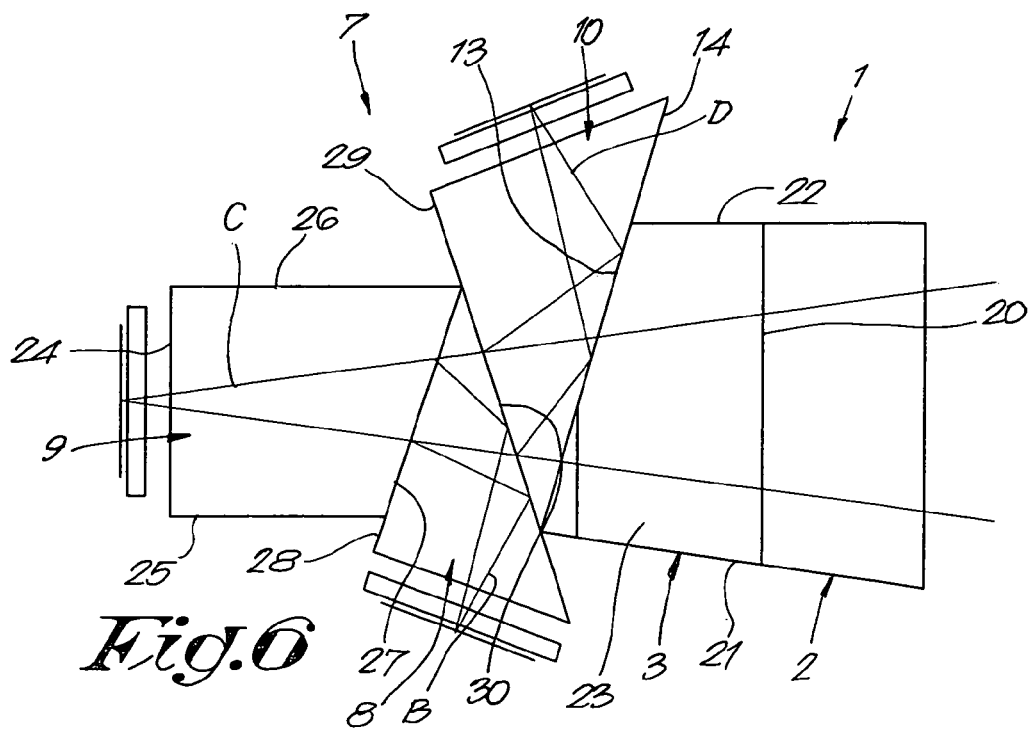

PRISM ASSEMBLY FOR USE IN OPTICAL DEVICES AND PROJECTOR COMPRISING SUCH A PRISM ASSEMBLY

This application claims the benefit of provisional application No. 60/606,125 under 35 U.S.C. § 119(e), and said provisional application is incorporated herein in its entirety by reference.

BACKGROUND OF THE INVENTION

1. Field of the Invention

The present invention concerns an improved prism assembly for use in optical devices, such as in 3-chip DLP-projectors.

Digital light processing (DLP™) technology is often used in digital projectors. DLP is a trademark of Texas Instruments in the United States of America. These projectors use a digital multi-mirror device (DMD) to modulate the light.

Each pixel in the chip can direct the light that hits it in either the 'on state' or the 'off state'. The on state light reaches the screen and gives a white pixel, while the off state light is absorbed inside the projector; this results in a dark pixel.

For best light-output and saturated colors, it is best to use three DMD's, one for the red, green and blue light.

2. Discussion of the Related Art

Currently, two architectures are used: a 5-element prism assembly (also called "Philips-prism") and a 6-element prism assembly, which both have different disadvantages. As shown in FIGS. 1 and 2, with the classical 5-element solution (Philips prism), the three DMD's are combined using five individual prisms.

The TIR (total internal reflection) assembly 1 consists of two prisms 2 and 3. There is a small air gap between these two prisms (in the order of 10 μm). The function of the TIR-prisms is to direct the incoming light to each of the respective the DMD's 4 to 6, while allowing the on state light to exit.

The color prism assembly 7 consists of three prisms 8 to 10. Their function is to split the incoming light A into three spectral bands B, C and D, one for each DMD 4 to 6. This is achieved with two dichroic coatings. After reflection and modulation of the light at the DMD, the color prisms 8 to 10 recombine the light. There are also air gaps between the three prisms 8 to 10 of the assembly 7.

The TIR-prism assembly 1 and the color prism assembly 7 are mounted so that an air gap 11 of about one millimeter exists between the two.

A disadvantage of the classical five-element solution is the "dichroic shift light" in the color prisms 8 to 10.

This is caused by the dichroic coatings, which are used for separating and combining the three colors. The root cause is the angle dependence of these dichroic coatings.

The incoming bundle of light (separation) has a certain angle of incidence on the respective DMD, determined by the tilting angle of the DMD, whereas the exiting bundle (recombination) has a right angle on the DMD. Both bundles have thus different angles of incidence on the dichroic coatings and the characteristics of the dichroic coatings are different for both bundles.

The problem arises when a coating reflects light during the separation process, but then transmits it during the recombination. It also arises in the complementary situation, when a coating transmits light during the separation process, but then reflects it during the recombination.

This dichroic shift light is undesirable, because it heats up the prism assembly and it can end up on the screen as stray light, which lowers contrast.

The classical 6-element prism assembly, which is shown in FIGS. 3 and 4, was developed in order to reduce the dichroic shift light. There is an extra element 12 between the TIR prism assembly 1 and the color prism assembly 7. This sixth element 12 allows a big reduction of the angle of the blue dichroic coating, at the expense of a small increase of the angle of the red dichroic coating. The smaller these angles, the better the coatings perform with respect to dichroic shift light.

A second advantage of the 6-element prism assembly is increased transmission, because of the improved performance of the coatings.

An important disadvantage of the 6-element prism assembly is the increased cost.

Another disadvantage is the increased required optical path length, measured along the optical axis. This makes it more difficult and costly to design and manufacture a suitable projection lens.

SUMMARY OF THE INVENTION

The present invention aims therefore at providing an improved prism assembly which does not show the above mentioned and other disadvantages.

To this end the invention relates in the first place to an improved prism assembly for use in optical devices, which comprises a total internal reflection (TIR) assembly, for redirecting an incoming lightbeam, a color prism assembly, for splitting the incoming lightbeam into spectral bands, and at least one reflection light valve for redirecting and recombining the spectral bands to form an outgoing lightbeam, whereby said total internal reflection assembly shows a back surface and said color prism assembly shows a front surface facing said back surface and being parallel therewith, wherein said back surface forms an angle with a general plane defined by the incoming and the outgoing lightbeams, which is different from 90°.

An advantage of this configuration, is that the optical path length is significantly shorter than with the 6-element prism. It is possible to maintain the same optical path length as the classical 5-element prism, without the risk of blocking light.

Another advantage of an improved prism assembly according to the present invention is that the transmission of the new design is slightly higher than with the 6-element prism. The angles of the dichroic coatings are the same, so that makes no difference. However, two glass-air transitions are avoided, namely the air gap between the sixth element and the back of the lower TIR-prism.

An additional advantage of an improved prism assembly is that the dichroic shift performance of such a prism assembly according to the invention is comparable to the performance of the 6-element prism.

Yet another advantage of an improved prism assembly according to the present invention is that it requires as little optical components as possible, cost and transmission losses at the glass-air transitions can be reduced.

The present invention also relates to a projector comprising an improved prism assembly, which prism assembly comprises a total internal reflection (TIR) assembly, for redirecting an incoming lightbeam, a color prism assembly, for splitting the incoming lightbeam into spectral bands, and at least one reflection light valve for redirecting and recombining the spectral bands to form an outgoing lightbeam, whereby said total internal reflection assembly shows a back surface and said color prism assembly shows a front surface facing said back surface and being parallel therewith, wherein said back surface forms an angle with a general plane defined by the incoming and the outgoing lightbeams, which is different from 90°.

Preferably said projector is a DLP™-type projector.

BRIEF DESCRIPTION OF THE DRAWINGS

In order to better show the characteristics of the invention, some preferred embodiments according to the present invention are described hereafter, as an example and without any restrictive character whatsoever, reference being made to the accompanying drawings, in which:

FIG. 5 represents a side view of an improved prism assembly according to the invention;

FIG. 6 represents a top view of a prism assembly according arrow F2 in FIG. 5;

DESCRIPTION OF THE PREFERRED EMBODIMENTS

Figure 1:
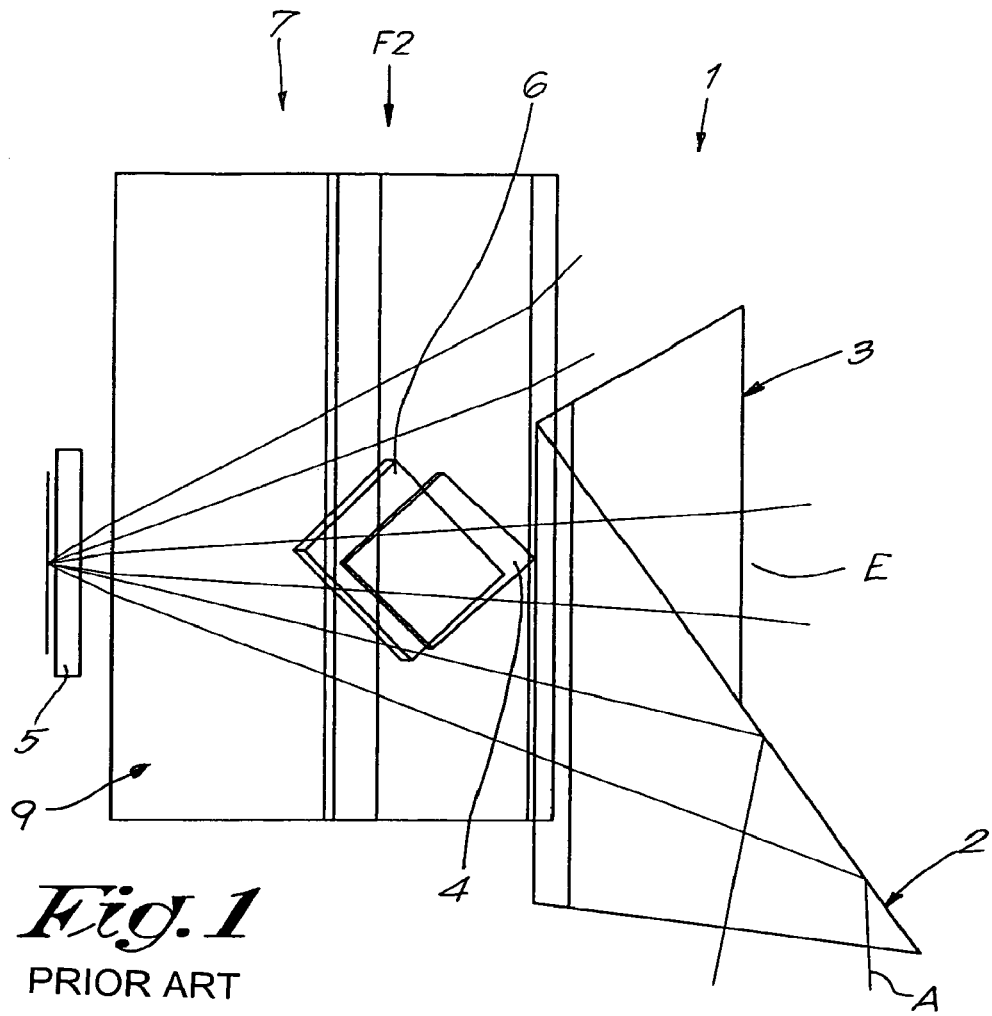
FIGS. 1 to 4 represent classical 5- and 6-element prism assemblies as described above.

FIGS. 1 to 4 show classical 5-element and 6-element prism assemblies which have already been described in detail in the discussion of the related art.

As shown in FIGS. 5 to 8, an improved prism assembly according to the invention comprises a total internal reflection (TIR) assembly 1, for redirecting an incoming lightbeam A, a color prism assembly 7, for splitting the incoming lightbeam A into spectral bands B, C and D, and at least one reflection light valve for redirecting and recombining the spectral bands B, C and D to form an outgoing lightbeam E, whereby said total internal reflection assembly 1 shows a back surface 13 and said color prism assembly shows a front surface 14 facing said back surface 13 and being parallel therewith, wherein said back surface 13 forms an angle with a general plane defined by the incoming and the outgoing lightbeams A and E, which is different from 90°.

In this case, said prism assembly is provided with three reflection light valves, in the form of DMD's 4 to 6, respectively one for each color red, green and blue. However, it is clear that the invention is not restricted as such.

Preferably said total internal reflection assembly 1 consists of a first prism 2 and a second prism 3, whereby said first prism 2 and said second prism 3 are spaced apart by a thin gap, for example in the form of an air gap.

According to a preferred form of embodiment of a prism assembly according to the invention, said first prism 2 and said second prism 3, have at least one parallel surface.

In the drawings, said back surface 13 is at least partially formed by a surface of said first prism 2. It is clear that it is also possible that said back surface 13 is at least partially formed by a surface of said second prism 3.

Figure 9:
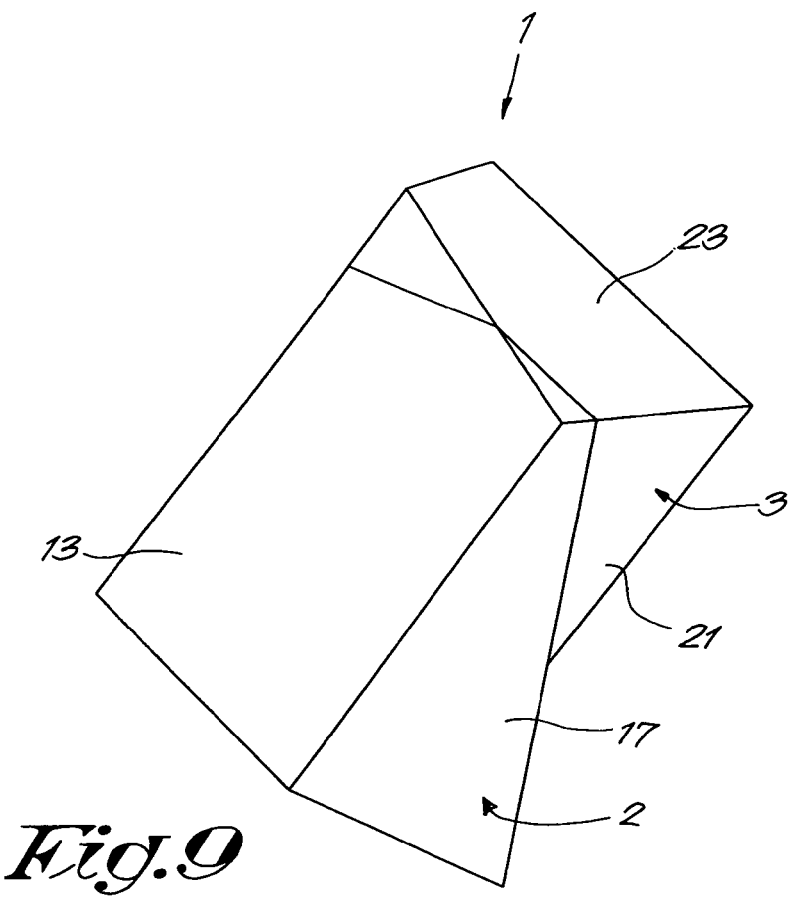
FIGS. 9 to 11 represent three dimensional views of the total internal reflection assembly of a prism assembly according to the invention.
Figure 10:
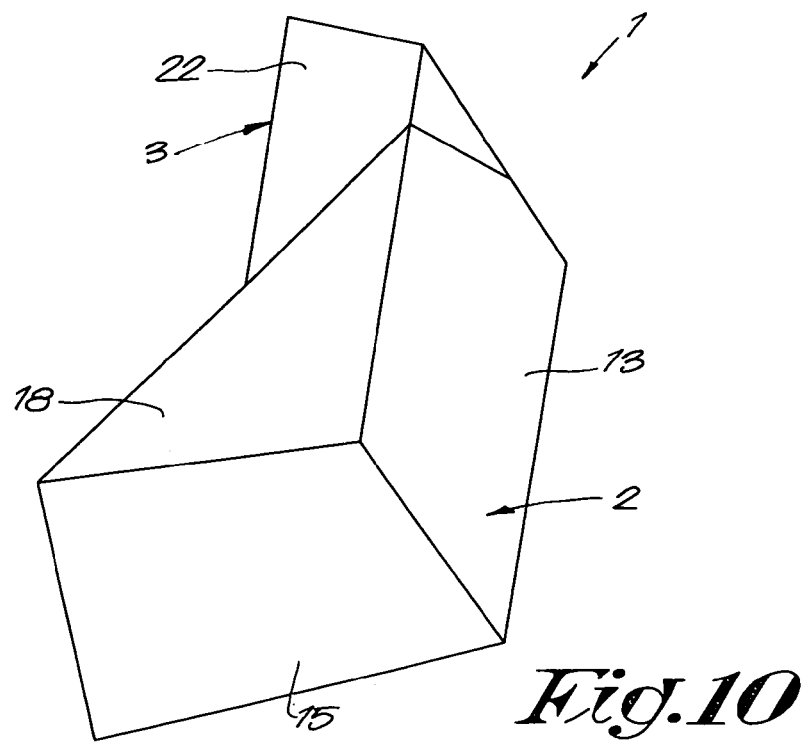
Figure 11:
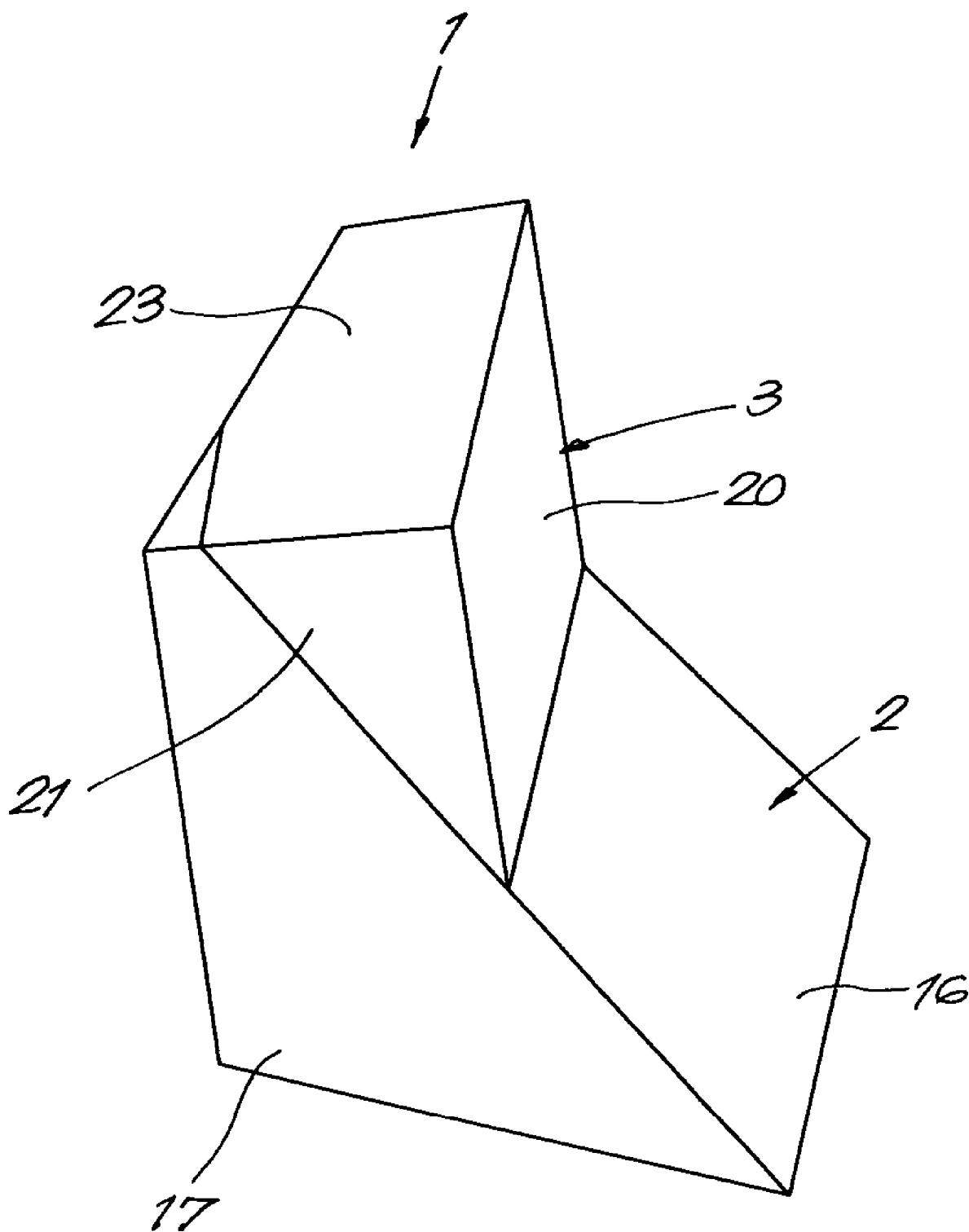

As can be seen in FIGS. 9 to 11, a total internal reflection assembly 1 according to the present invention preferably comprises a base surface 15 which is connected to said back surface 13, enclosing an angle therewith and which is perpendicular to the general plane defined by the incoming and the outgoing lightbeams A and E; and a redirecting surface 16, connecting said back surface 13 with said base surface 15, which is perpendicular to the general plane defined by the incoming and the outgoing lightbeams A and E.

The embodiment of total internal prism assembly 1 as shown FIGS. 9 to 11, further comprises two side surfaces 17 and 18 which are connected to said back surface 13 and which diverge with respect thereto; and wherein said redirecting surface 16 is connected to said side surfaces 17 and 18.

Said second prism 3 preferably comprises a first surface 19 which is parallel to said redirecting surface 16 of said first prism 2; and a front surface 20, being perpendicular to the general plane defined by the incoming and the outgoing lightbeams A and E.

Said second prism 3 of the improved prism assembly according to the invention further comprises two side surfaces 21 and 22 which are connected to said first surface 19 of the second prism 3 and which are provided in the same face as the side surfaces 17 and 18 of the first prism 2.

In a preferred form of embodiment of a prism assembly according to the present invention, said second prism 3 further comprises an upper surface 23, extending between said front surface 20 and said side surfaces 21 and 22 of the second prism 3, whereby said upper surface 23 of the second prism 3 and said base surface 15 of the first prism 2 diverge with respect to each other.

According to the most preferred form of embodiment of a prism assembly according to the invention, said color prism assembly 7 consists of three prisms 8 to 10 for different colors, and more specific a red prism 8, a green prism 9 and a blue prism 10.

Said three prisms 8 to 10 of the color prism assembly 7 are preferably formed by an upstanding first prism 9 in the form of a quadrangular prism, which has a first upstanding surface 24 and two side surfaces 25 and 26, perpendicular to said first surface 24 and a second surface 27 extending between said side surfaces 25 and 26 and enclosing an angle therewith, differing from 90°; and two triangular prisms 8 and 10, the first triangular prism 8 of which a first side 28 opposes said second face 27 of the quadrangular first prism 9 and the second triangular prism 10 of which a side 29 opposes a second side 30 of said first triangular prism 8.

In a practical form of embodiment, said quadrangular prism 9 and said triangular prisms 8 and 10 are spaced apart from each other, defining gaps therebetween.

According to the drawings 5 to 11, the improved prism assembly according to the invention has five prisms 2, 3, 8, 9 and 10 but combines the technical advantages of both existing 5-element and 6-element prism assemblies, at a cost point between the two.

Figure 3:
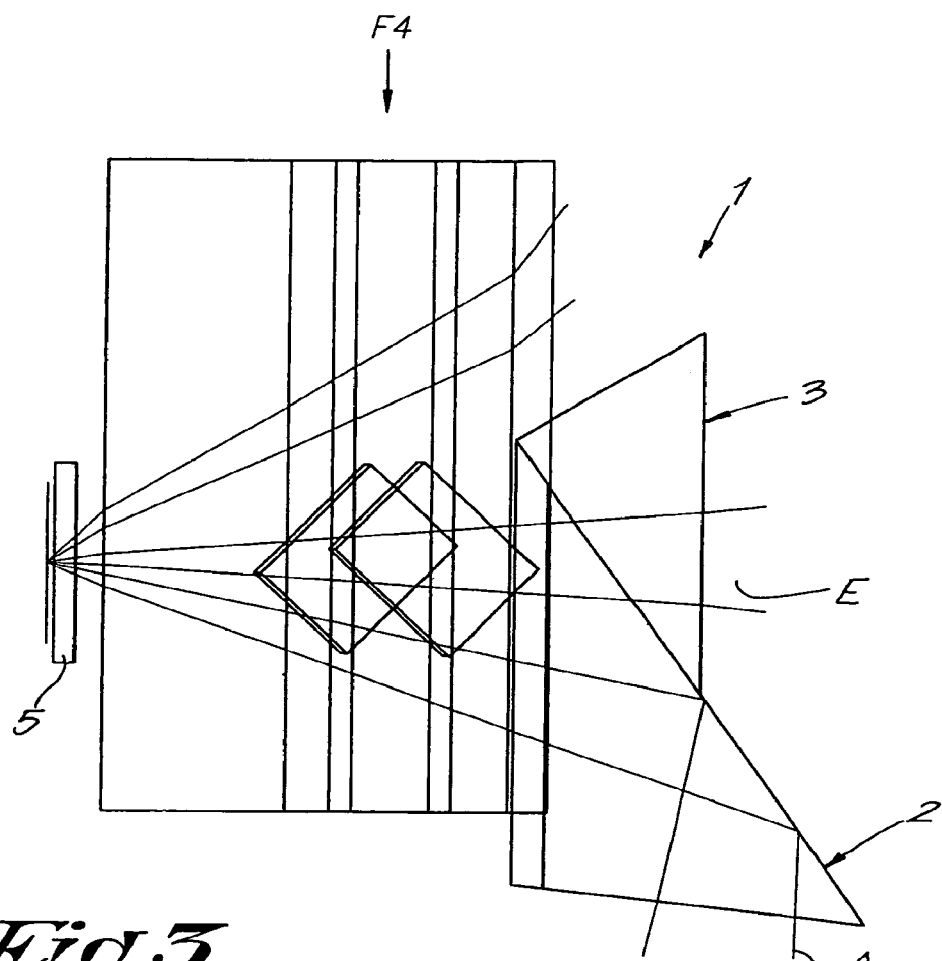
Figure 4:
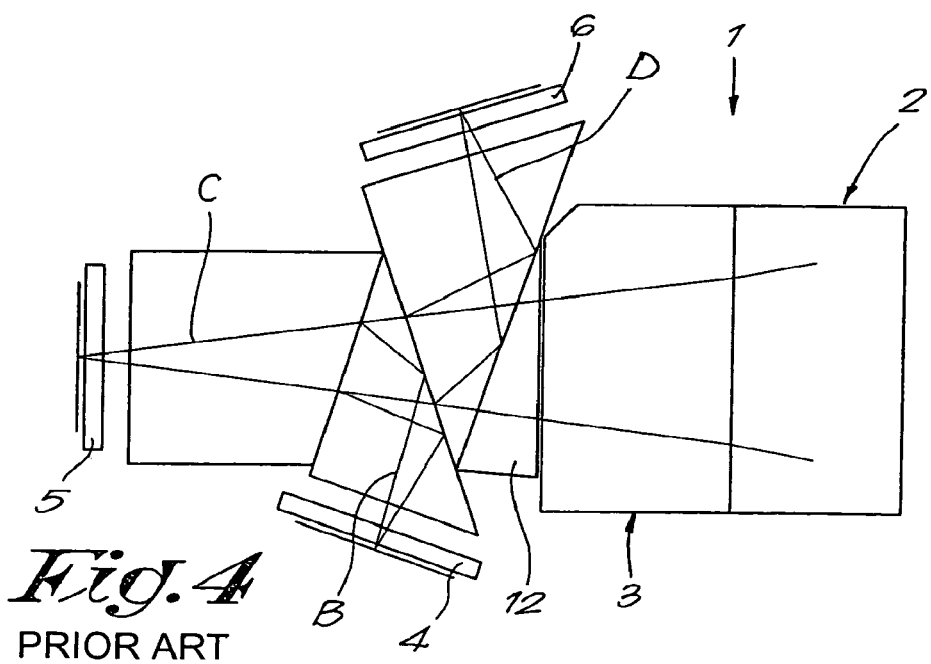
Figure 7:
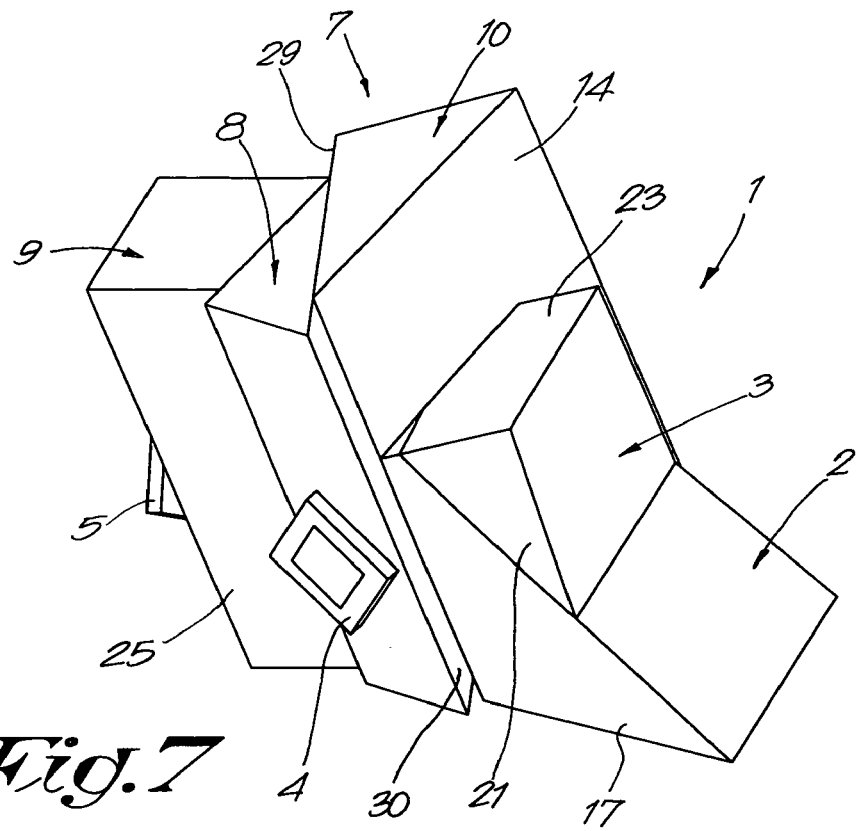
FIGS. 7 and 8 represent three dimensional views of an improved prism assembly according to the invention.
Figure 8:
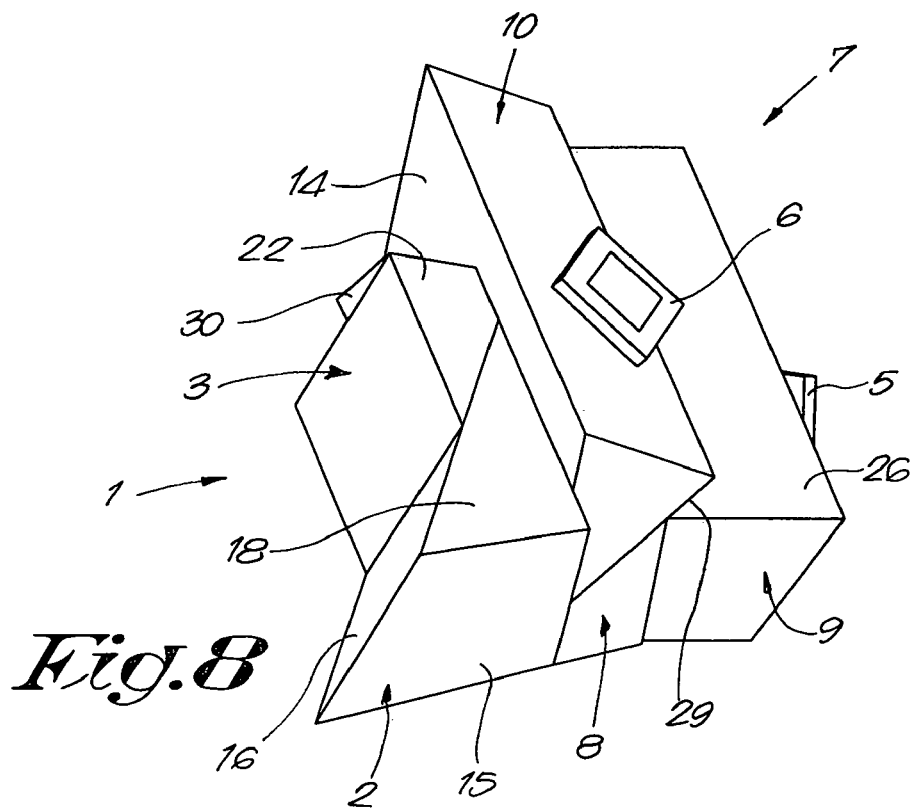

The proposed new prism assembly combines the blue, red and green prism 8, 9 and 10 with the 6-element design od FIGS. 3 and 4. The combination of the sixth element 12 of the 6-element design and the two prisms 2 and 3 of the TIR-prism assembly 1 is replaced with a more compact assembly of two prisms 2 and 3.

The first prism 2 of the total internal reflection assembly 1 takes over the function of the sixth element 12.

Figure 2:
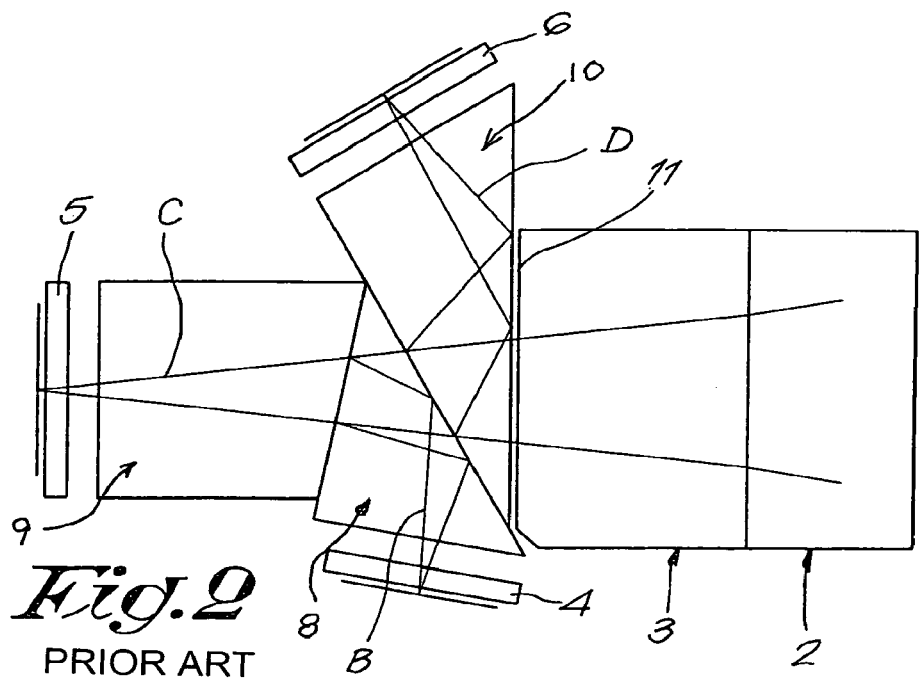

The new prism assembly comprises five prisms 2, 3, 8, 9 and 10, but the shape of the two prisms 2 and 3 of the total internal reflection assembly 1 is slightly more complex than in the two classical designs. There are fewer right angles, but the number of surfaces and edges are the same. Thus, the cost of the new design should be only slightly larger than the 5-element prism as shown in FIGS. 1 and 2.

The invention is in no way limited to the embodiments described above and represented in the drawings, but such an improved prism assembly may be realized in different shapes and dimensions, without departure from the scope of the invention.

The invention claimed is:

1. A prism assembly for use in optical devices, which comprises a total internal reflection (TIR) assembly, for redirecting an incoming lightbeam, a color prism assembly, for splitting the incoming lightbeam into spectral bands, and at least one reflection light valve for redirecting and recombining the spectral bands to form an outgoing lightbeam, wherein said total internal reflection assembly has a back surface and said color prism assembly has a front surface facing said back surface and being parallel therewith, and wherein said back surface forms an angle with a general plane defined by the incoming and the outgoing lightbeams, which is different from 90°.

2. The prism assembly according to claim 1, wherein said total internal reflection assembly comprises a first prism and a second prism.

3. The prism assembly according to claim 2, wherein said first prism and said second prism are spaced apart by a thin gap.

4. The prism assembly according to claim 3, wherein said gap is an air gap.

5. The prism assembly according to claim 2, wherein said first prism and said second prism have at least one parallel surface.

6. The prism assembly according to claim 2, wherein said back surface is at least partially formed by a surface of said first prism.

7. The prism assembly according to claim 6, said first prism comprising:
   a base surface which is connected to said back surface, enclosing an angle therewith and which is perpendicular to the general plane defined by the incoming and the outgoing lightbeams;
   a redirecting surface, connecting said back surface with said base surface, which is perpendicular to the general plane defined by the incoming and the outgoing lightbeams.

8. The prism according to claim 7, wherein said first prism further comprises two side surfaces which are connected to said back surface and which diverge with respect thereto; and wherein said redirecting surface is connected to said side surfaces.

9. The prism assembly according to claim 7, said second prism comprising:
   a first surface which is parallel to said redirecting surface of said first prism; and
   a front surface, being perpendicular to the general plane defined by the incoming and the outgoing lightbeams.

10. The prism assembly according to claim 9, wherein said second prism further comprises two side surfaces which are connected to said first surface of the second prism and which are provided in the same face as the side surfaces of the first prism.

11. The prism assembly according to claim 10, wherein said second prism further comprises an upper surface, extending between said front surface and said side surfaces of the second prism.

12. The prism assembly according to claim 11, wherein said upper surface of the second prism and said base surface of the first prism diverge with respect to each other.

13. The prism assembly according to claim 2, wherein said back surface is at least partially formed by a surface of said second prism.

14. The prism assembly according to claim 1, wherein said color prism assembly comprises three prisms for different colors.

15. The prism assembly according to claim 14, wherein said color prism assembly comprises a blue prism, a red prism and a green prism.

16. The prism assembly according to claim 14, wherein the three prisms of the color prism assembly are formed by:
   an upstanding first prism in the form of a quadrangular prism, which has a first upstanding surface and two side surfaces, perpendicular to said first upstanding surface and a second surface extending between said side surfaces and enclosing an angle therewith, differing from 90°;
   two triangular prisms, the first triangular prism of which a first side opposes said second face of the quadrangular prism and the second triangular prism of which a side opposes a second side of said first triangular prism.

17. The prism assembly according to claim 16, wherein said quadrangular and said triangular prisms are spaced apart from each other, defining gaps therebetween.

18. A projector, comprising a prism assembly, which prism assembly comprises a total internal reflection (TIR) assembly, for redirecting an incoming lightbeam, a color prism assembly, for splitting the incoming lightbeam into spectral bands, and at least one reflection light valve for redirecting and recombining the spectral bands to form an outgoing lightbeam, wherein said total internal reflection assembly has a back surface and said color prism assembly has a front surface facing said back surface and being parallel therewith, wherein said back surface forms an angle with a general plane defined by the incoming and the outgoing lightbeams, which is different from 90°.

19. The projector according to claim 18, wherein said projector is a Digital Light Processing (DLP™) type projector.

* * * * *